June 12, 1951          R. S. ARKLESS          2,556,609
PLASTIC WELDING DEVICE
Filed April 18, 1949
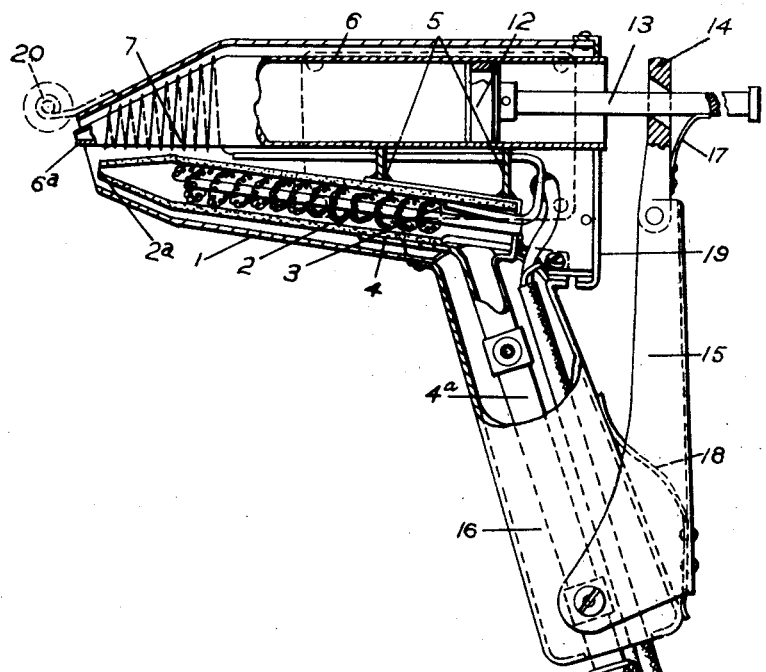
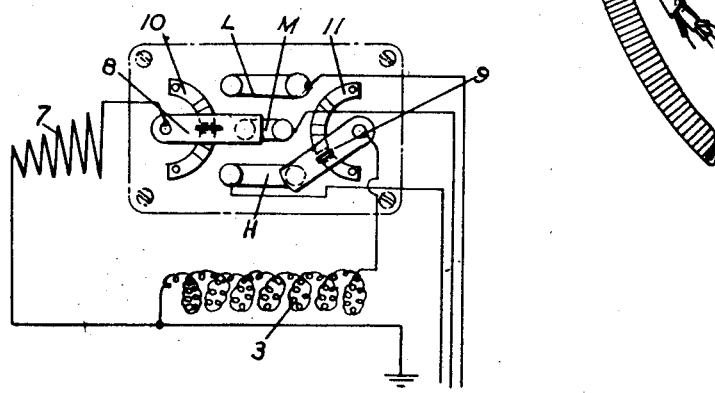
Inventor
Richard Smurthwaite Arkless
By
Alexander Dowell
Attorneys Patented June 12, 1951

2,556,609

UNITED STATES PATENT OFFICE 2,556,609

PLASTIC WELDING DEVICE

Richard Smurthwaite Arkless, Billingham-on-Tees, England

Application April 18, 1949, Serial No. 88,090
In Great Britain April 28, 1948

4 Claims. (Cl. 154—42)

This invention consists in a plastic extrusion welding device.

The object of the invention is to provide a device whereby the welding of plastics may be effected in a single operation, that is to say, without the operator's requiring to use both hands, the one to hold the material and the other to feed the welding medium, with a view to imparting simplicity in and increased speed of operation.

The welding device according to the invention comprises a heating gun or torch having mounted adjacent and in an axial plane of the barrel thereof, a cylinder for containing a thermoplastic material or filler which serves as the welding medium, an extrusion nozzle on the end of the cylinder, said nozzle being substantially coterminous with the nozzle of the gun barrel, and a piston in the said cylinder which is adapted to be pressed against the filler, a heating coil being arranged around the said cylinder for reducing the welding medium to a malleable state so that under the pressure of the piston it is easily extruded from the end of the cylinder into the path of the heated gas.

With a view to increasing the heating effect the heated gas may be superheated steam, the increased heating effect being due to the relatively high latent heat of superheated steam.

The piston may be operated either by hand or by means of a spring.

The invention will now be described by way of example with reference to the accompanying drawings.

In the said drawings:

Fig. 1 is a partial sectional elevation.

Fig. 2 is a diagram showing the heating circuits and their control switches.

Referring more particularly to the drawings, 1 is the casing of the device. In the lower portion of the casing 1 is a heating gun which comprises a refractory tube 2 inside which is an electric heating element 3 over which is passed a stream of gas which emerges from the nozzle 2a of the refractory tube 2 at a suitable temperature for softening the base. The tube 2 is mounted at its inner end in a metal tubular socket 4 connected to a tube 4a adapted for connection to an inert gas supply. Inside the casing 1 and connected to the socket 4 by means of brackets 5 above and at an angle to the heating element 3 is a cylinder 6 which is substantially co-terminous with the nozzle 2a of the refractory tube 2, and at this end tapers down to an extrusion nozzle 6a. At the extrusion end and extending over the tapered portion of the cylinder 6 there is arranged a heating coil 7 which is capable of three heats as is also the coil 3 of the tube 2, the coil being connected to a three position switch 8 whose three contacts are adapted to be connected through a switch 9 for the heating to three different transformer tappings (not shown) for giving the different currents for the three heats. An outside view of the switches is shown in Fig. 2 in which the arms 8 and 9 traverse segments 10, 11 having radial grooves which allow the arms to drop on to two sides of raised contacts L, M, H, respectively. The contacts L, M, H, are electrically connected to one another and to the transformers by leads P, so that the heaters may be connected independently to one or other of the three voltages. The outer end of the coil 7 is earthed to the nozzle 6a.

The other end of the cylinder 6 is open and inside it there is a piston 12 having a rod 13 extending therefrom and passing through an opening at the end of an arm 14 pivotally mounted on the free end of an operating arm 15 which in its turn is pivotally mounted on a hollow handle 16 which is flared at its upper end at 16a for securing to the casing 1, the shank being secured to the gas tube 4a from either side. The handle 16 also houses the electric cable.

The opening in the arm 14 is in longitudinal section rhomboidal with the rear upper and the front lower edges maintained in contact with the rod 13, by means of a leaf spring 17, so that when the arm 15 is moved inwardly the arm 14 tends to rock relatively thereto and the edges of its opening grip the rod causing it to move inwards, but when the arm 15 is moved in the opposite direction the arm 14 rides freely along the rod 10. The arm 15 is operated against a light spring 18, and when it is gripped and pressed, the piston 12 is moved inwards and feeding of the plastic filler is effected.

A cap 19 closes the open or rear end of the casing 1, a hole being formed in it for passing over the protruding end of the cylinder 6.

The plastic filler is preferably in the form of cartridges which are easily slipped into the cylinder of the device. It may also be in the form of powder.

Instead of making the heating gun and the filler cylinder in one, they may be hinged together so that their axes may be arranged at an angle to vary the point of intersection of the extruded filler with the heated gas.

A roller may be arranged at the nozzle end of the device as shown in dotted lines at 20 in Fig.

1 for pressing down with soft plastic filler after it has been extruded and melted in the desired position.

In operation, a cartridge of plastic filler is charged into the barrel, and the piston inserted. The current for heating the plastic filler is then switched on; and when, as a result of light pressure on the feeding lever, the filler begins to extrude from the barrel, the heating gun is brought into operation. As the soft plastic filler is extruded, the heating gas melts the filler and base thus obtaining satisfactory union. Welding can thus be carried out with one hand, the operator's other hand being free.

I claim:

1. A plastic extrusion welding device comprising a heating gun barrel, a nozzle on said barrel, a cylinder adapted to contain thermo-plastic material mounted adjacent and in axial plane of said barrel, an extrusion nozzle on the end of said cylinder, said cylinder nozzle being substantially co-terminous with said barrel nozzle, a piston in said cylinder adapted to be pressed against the thermo-plastic material, a heating coil arranged around said cylinder nozzle, and a tube communicating with said barrel, said tube being adapted for connexion to an inert gas supply, the arrangement being such that when the piston is forced against the heated thermo-plastic material, the latter is extruded into the path of the heated gas.

2. A welding device according to claim 1, wherein the piston has extending therefrom a piston rod, a pivoted operating arm, an arm pivotally mounted on the free end of said operating arm, said rod passing through an opening in the free end of said pivoted arm, and means for maintaining the edges of said opening in contact with said piston rod so that during the outward movement of the operating arm it rides freely over said piston rod, but grips it on the inward stroke.

3. A welding device according to claim 1, comprising an outer casing which encloses the cylinder, barrel and gas tube, a piston rod extending from the piston, an operating arm pivotally mounted on the portion of the casing about the gas tube, an arm pivotally mounted on the free end of said operating arm, said rod passing through an opening in the free end of said pivoted arm, and means for maintaining the edges of said opening in contact with said piston rod so that during the outward movement of the operating arm it rides freely over said piston rod, but grips it on the inward stroke.

4. A welding device according to claim 1 wherein the heating gun barrel and the cylinder are hinged together so that their axes may be arranged at an angle in the same plane to vary the point of intersection of the extruded thermo-plastic material with the hot gas from the heating gun.

RICHARD SMURTHWAITE ARKLESS.

REFERENCES CITED

The following references are of record in the file of this patent:

UNITED STATES PATENTS

| Number | Name | Date |
|---|---|---|
| 2,220,545 | Reinhardt | Nov. 5, 1940 |
| 2,372,737 | Phillips | Apr. 3, 1945 |
| 2,437,263 | Manning | Mar. 9, 1948 |